United States Patent
Cushman et al.

[15] 3,639,011
[45] Feb. 1, 1972

[54] MULTIWHEELED LOCOMOTION DEVICE

[72] Inventors: Walton W. Cushman, Fraser, Mich.; Martin Tucker, trustee, New York, N.Y.

[22] Filed: Sept. 11, 1969

[21] Appl. No.: 857,106

[52] U.S. Cl. .............................305/35 EB, 305/20, 305/33, 280/28.5, 180/7 R, 180/9.64
[51] Int. Cl............................................................B62d 55/08
[58] Field of Search......................305/20, 33, 35 EB, 38, 34; 280/28.5; 180/9.2, 9, 64, 7

[56] References Cited

UNITED STATES PATENTS

| | | | |
|---|---|---|---|
| 1,450,643 | 4/1923 | Platt | 305/20 |
| 1,516,578 | 11/1924 | Platt | 305/20 |
| 2,556,270 | 6/1951 | Groeller | 305/35 EB X |
| 3,107,924 | 10/1963 | Cushman | 305/20 X |
| 3,533,482 | 10/1970 | Cushman | 305/20 X |

Primary Examiner—Richard J. Johnson
Attorney—Lon H. Romanski

[57] ABSTRACT

A multiwheeled locomotion device has a pair of hubless wheels or rollers for effectively engaging a surface along which the wheels propel the device; a first rotatable wheel or roller placed intermediate of the hubless wheels is operatively connected to such wheels by means of a load belt which also encircles a substantial portion of the periphery of each of the hubless wheels; and second and third reaction-type rollers or wheels are situated generally above the first roller and between the hubless wheels; a plurality of constraining belts looped about the reaction and first rollers tend to draw them together and in so doing cause upper and lower runs of the load belt which pass between the reaction and first rollers to be urged toward each other thereby creating a tension in the load belt.

19 Claims, 10 Drawing Figures

INVENTOR.
Walton W. Cushman
BY
ATTORNEY

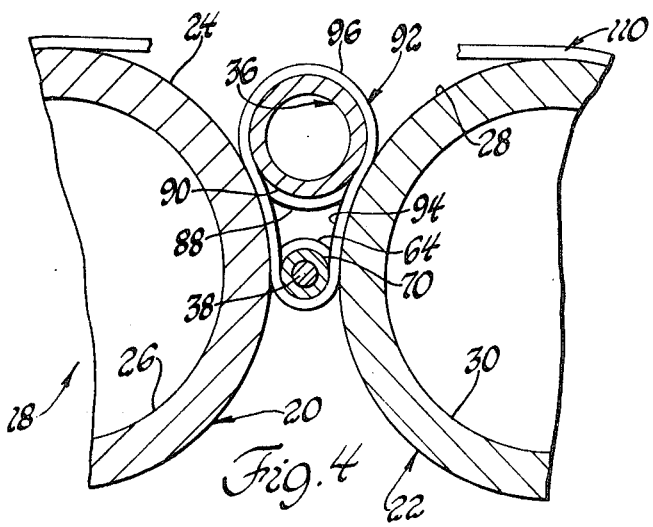
Fig. 4
Fig. 5
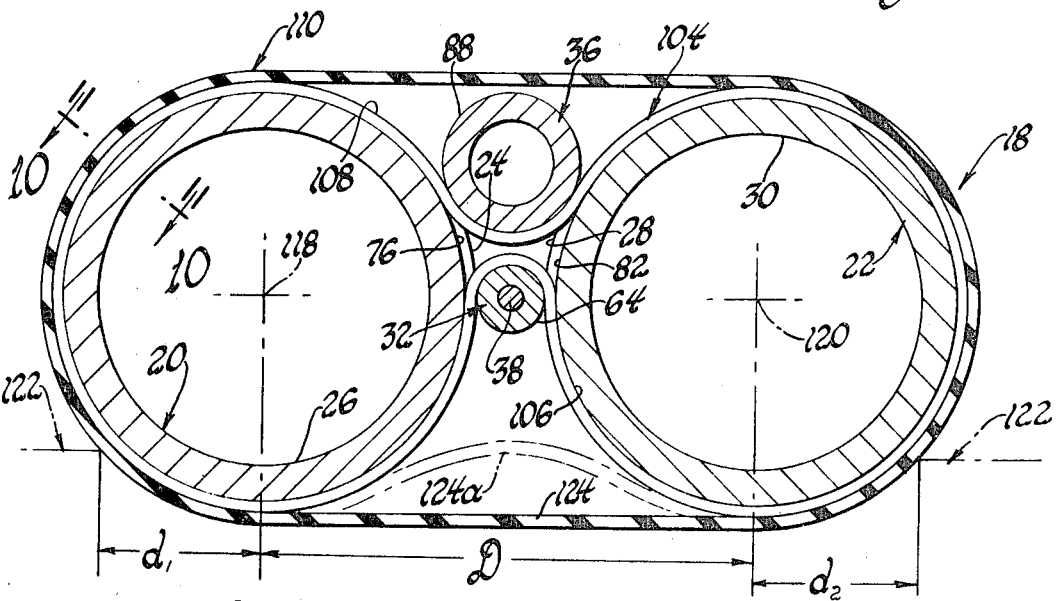
Fig. 6
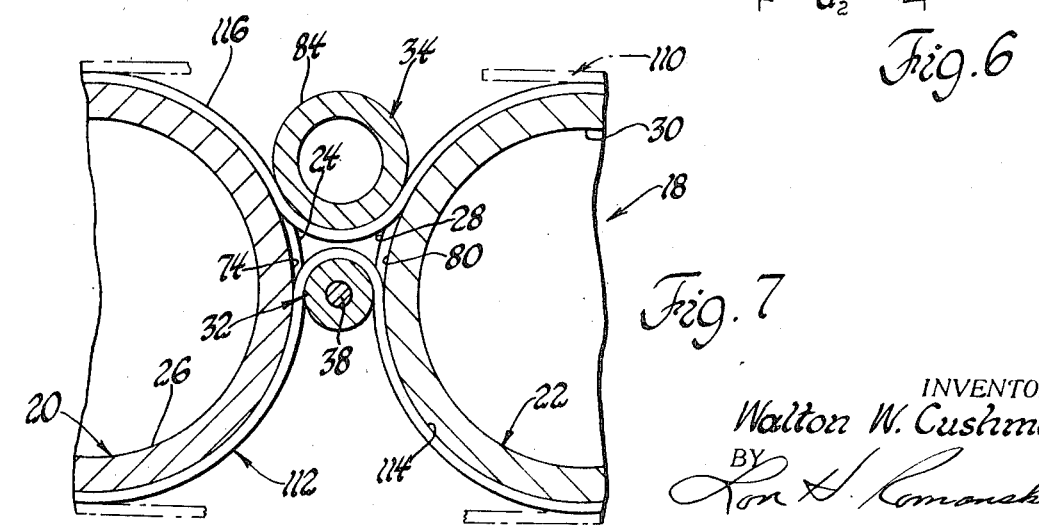
Fig. 7
INVENTOR.
Walton W. Cushman
ATTORNEY

MULTIWHEELED LOCOMOTION DEVICE

BACKGROUND OF THE INVENTION

This invention relates generally to surface locomotion apparatus and more particularly to improved apparatus especially adapted as a substitute for conventional wheel or endless track means in vehicular suspension and locomotion systems.

Such basic vehicular suspension and locomotion apparatus has, heretofore, been known in the art, as shown for example by U.S. Pat. No. 3,107,924. However, since that time it has been discovered that the many advantages of such basic apparatus can be further enhanced as well as complimented by further improvements which form the basis of this invention. For example, such prior art apparatus did not specifically disclose structure providing for, among other things, the creation of a reaction snubbing or constraining effect on several of the elements comprising such apparatus, or the positive assurance of tracking alignment or the arrangement of load supporting belts which would permit the tread belt, if one is employed, to flex and follow the hydraulic force of the surface material supporting the hubless wheeled apparatus and to thereby greatly increase the effective footprint of the locomotion apparatus.

Accordingly, the invention as herein disclosed and claimed is directly concerned with the provision of means for accomplishing the above as well as attaining various other benefits.

SUMMARY OF THE INVENTION

According to the invention, a multiwheeled integrated load-suspension and surface locomotion device for use with an associated vehicle, comprises at least first and second spaced surface locomotion wheels, first means circumferentially loading said spaced surface locomotion wheels, and second constraining means operatively engaging said first means and said spaced surface locomotion wheels, said second means comprising rotatable vehicle load input means and a plurality of reaction-type rotatable members.

Accordingly, an object of this invention is to provide a multiwheeled locomotion device as above, which has the ability to employ a tread belt in a manner causing the tread belt to flex and follow the hydraulic force of the surface material supporting the locomotion device.

Another object of this invention is to provide a multiwheeled locomotion device having at least two spaced surface locomotion wheels which, while having provision for maintaining relative rolling integrity, nevertheless can assume substantial skewed relationships with respect to each other.

Other more specific objects and advantages of the invention will become apparent when reference is made to the following detailed description considered in conjunction with the accompanying drawings.

DESCRIPTION OF THE DRAWINGS

In the drawings, wherein, for purposes of clarity, certain elements may be omitted from one or more views:

FIG. 4 is a typical enlarged fragmentary cross-sectional view taken on either the plane of line 4a—4a or line 4b—4b of FIG. 3 and looking in the direction of the arrows;

FIG. 5 is a typical enlarged fragmentary cross-sectional view taken on either the plane of line 5a—5a or line 5b—5b of FIG. 3 and looking in the direction of the arrows;

FIG. 6 is an enlarged cross-sectional view taken generally on the plane of line 6—6 of FIG. 3;

FIG. 7 is an enlarged fragmentary cross-sectional view taken generally on the plane of line 7—7 of FIG. 3 and looking in the direction of the arrows;

DESCRIPTION OF THE PREFERRED EMBODIMENT

Figure 1:
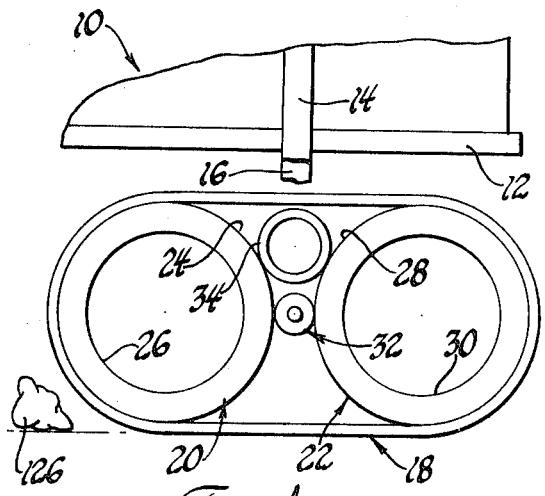
FIG. 1 is a side elevational view of a vehicle equipped with a multiwheeled traction device constructed in accordance with the teachings of this invention.

Referring now in greater detail to the drawings, FIG. 1, by way of example, illustrates, fragmentarily, a vehicle 10 having a body or frame portion 12 with downwardly depending strut-like supports 14 and 16 operatively connected to a wheeled traction device 18 constructed in accordance with the teachings of this invention. If the wheeled traction device 18 is considered as being mounted at the rear of the vehicle 10, then the forward portion of the vehicle 10 may be provided, if desired, with any suitable ground-engaging device such as, for example, a single steerable wheel. Since many suitable steering devices are well known in the art and do not form a part of this invention they are not specifically shown herein.

Figure 2:
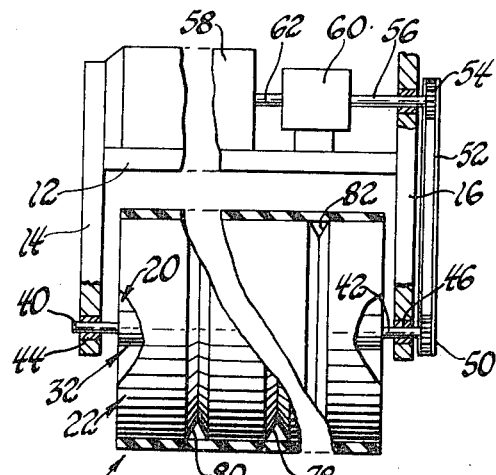
FIG. 2 is an end elevational view of the structure shown in FIG. 1, with portions thereof broken away and in cross section.
Figure 3:
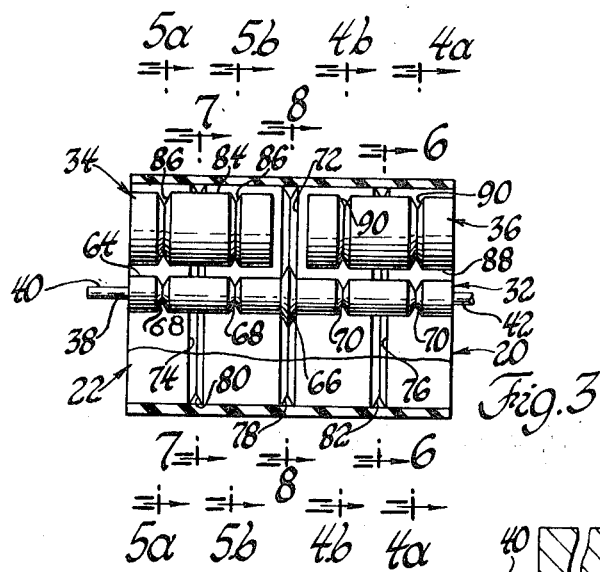
FIG. 3 is an end elevational view of the structure shown in FIG. 1 with the exception that approximately the upper three-quarters of one of the hubless wheels (shown at the right in FIG. 1) has been broken away in order to better illustrate the remaining hubless wheel and cooperating rollers or wheels.

As also seen in FIGS. 2 and 3, the wheeled traction device 18 is illustrated as being comprised of first and second spaced surface locomotion wheels 20 and 22, which, as shown, may be of a hollow or hubless configuration. (By hubless it is, of course, meant that the operation of or the load-carrying capabilities of the wheels 20 and 22 is not dependent upon the existence of a centrally disposed axle, functioning as a hub about which such wheels 20 and 22 respectively revolve.) Although the invention can be practiced by employing various materials for the formation or fabrication of the surface locomotion wheels 20 and 22, it is nevertheless contemplated that in preferred construction, wheels 20 and 22 would be machined, cast or otherwise formed from a tough, wear-resistant semirigid elastomer. It should also be apparent that the wall thickness of the wheels, that is, the distance between the outer diameter 24 and the inner diameter 26 of wheel 20 as well as the distance between the outer diameter 28 and the inner diameter 30 of wheel 22 can be varied to any suitable desired dimension and, if desired, such wheels 20 and 22 may actually be completely filled so as to have a solid cross section.

Figure 9:
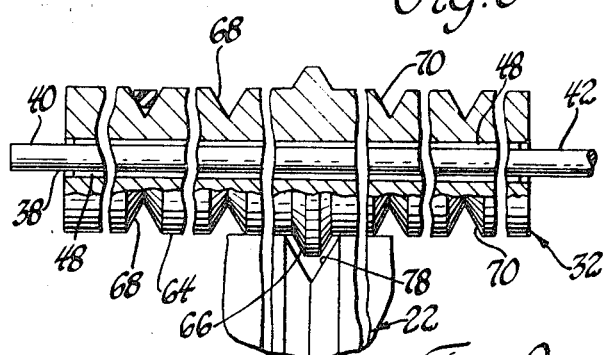
FIG. 9 is a further enlarged fragmentary cross-sectional view taken on the plane of line 9—9 of FIG. 8 and looking in the direction of the arrows.

In any event, a rotatable power input member 32 is situated generally between the surface driving wheels 20 and 22 and retained in such position by virtue of being operatively connected to upwardly disposed snubbinglike rotatable reaction members 34 and 36 as by a system or cooperating continuous belts. The power input member 32 is illustrated as being of a cylindrical or rollerlike configuration having a centrally disposed axle shaft 38 passing therethrough and having ends 40 and 42 suitably journaled within bearings 44 and 46 carried by supports or struts 14 and 16. As illustrated, it is contemplated that the power input roller 32 would be formed of a suitable semirigid elastomer such as, for example, an elastomer from the class of polyurethane materials. However, this is not to say that other materials as, for example, aluminum, could not be employed. As illustrated in FIG. 9, the axle or drive shaft 38 may be provided with a plurality of axially extending splines 48 which coact with mating axially extending slots formed within roller 32 in order to thereby transmit driving torque from the shaft 38 to the power input roller or hub 32.

As generally shown in FIG. 2, end 42 of shaft 38 may have a driven sprocket wheel 50 fixedly secured thereto for operatively engaging a power transmitting drive chain 52 which is also looped about a drive sprocket wheel 54 secured to a power output shaft 56. A suitable prime mover or engine 58, carried by the vehicle 10, operatively drives shaft 56 as by means of a suitable transmission assembly 60 and an input shaft 62 leading thereto.

As best seen in FIGS. 3 and 9, the outer cylindrical surface 64 of main load hub or roller 32 is provided with a generally medially situated guide flange 66 formed thereon and circumferentially thereabout. Additionally, to one side of flange 66, a plurality of belt grooves 68—68 are formed in roller 32 circumferentially thereabout, in a manner as to be axially spaced from each other and the flange 66. Similarly, a second plurality of belt grooves 70—70 are formed in roller 32, circumferentially thereabout, on the other axial side of flange 66.

As also seen in FIG. 3, each of the surface locomotion wheels 20 and 22 is provided with a circumferentially extending guide groove and a plurality of main load belt grooves. For example, surface locomotion wheel 20 has formed therein a guide groove 72 and main load belt grooves 74 and 76 while surface wheel 22 has formed therein a medially situated guide groove 78 and spaced main load belt grooves 80 and 82. With the surface locomotion wheels 20 and 22 in assembled relationship as shown in FIG. 3, main load belt grooves 74 and 80 are held in a generally common plane passing therethrough and between belt grooves 68—68 of roller 32, while main load belt grooves 76 and 82 are held in a second spaced generally common plane passing therethrough and between belt grooves 70—70 of roller 32.

As shown, for example, in FIG. 3, the upwardly situated snubbing or reaction roller members 34 and 36 are each provided with a plurality of circumferentially extending grooves formed therein. That is, the outer cylindrical surface 84 of reaction roller 34 has a plurality of axially spaced reaction or snubbing belt grooves 86—86 while the outer cylindrical surface 88 of reaction roller 36 has a plurality of axially spaced reaction or snubbing belt grooves 90—90 formed therein. It will be noted that when the reaction members 34 and 36 are assembled into positions as shown in FIG. 3, grooves 86—86 fall into generally the same planes respectively passing through grooves 68—68 of main load hub 32 and that similarly grooves 90—90 of reaction member 36 are contained generally in the same planes respectively passing through grooves 70—70 of load hub 32.

As is evident, the various belt arrangements have not been shown in FIGS. 1, 2 and 3 since the inclusion of such therein would only tend to obscure the disclosure. For this purpose FIGS. 4, 5, 6, 7 and 8 (some of which are fragmentary cross-sectional views) have been provided which, it is believed, better illustrate the various belts employed.

For example, as typically shown in FIG. 4, a continuous or endless snubbing or reaction belt 92 is generally received within groove 90 of reaction roller 36 and a cooperating groove 70 of main load hub or roller 32. As can be seen, the belt 92 passes generally over the top of reaction roller 36 and under the main load hub 32. In so doing, the inner surface 94 of belt 92 is held against grooves 90 and 70 while the outer surface 96 of the belt 92 engages and continues for some arcuate portion against the outer cylindrical surfaces of diameters 24 and 28 of main surface wheels 20 and 22, respectively.

It should be mentioned that even though FIG. 4 is a view taken on the plane of either line 4a—4a or line 4b—4b of FIG. 3 which passes through the medial portion of the coacting grooves and belt, the belt 92 has been shown in elevation rather than cross-hatched in the belief that this would more clearly illustrate the coaction of the various elements. The same also applies to FIGS. 5, 6 and 7.

In view of the above, it can be seen that if, if FIG. 4, clockwise rotation of shaft 38 and main load roller 32 is assumed, upper reaction roller 36 will also rotate clockwise and in so doing, by virtue of its outer diameter 88 rolling against the outer diameters 24 and 28 of main locomotion wheels 20 and 22, along with the outer surface 96 of belt 92 frictionally engaging the same outer cylindrical surfaces 24 and 28, cause main surface wheels 20 and 22 to rotate counterclockwise. Such counterclockwise rotation of wheels 20 and 22 would, of course, cause the device 18 to move to the left.

FIG. 5, a fragmentary cross-sectional view taken on the plane of either line 5a—5a or line 5b—5b of FIG. 3, illustrates the second reaction roller 34 and the belt system employed for connecting it to the main load roller 32. For example, as typically shown in FIG. 5, a continuous or endless snubbing or reaction belt 98 is generally received within groove 86 of reaction roller 34 and a cooperating groove 68 of main load hub or roller 32. As can be seen, the constraining belt 98 passes generally over the top of reaction roller 34 and under the main load hub 32. In so doing, the inner surface 100 of belt 98 is held against grooves 86 and 68 while the outer surface 102 of the belt 98 engages and continues for some arcuate portion against the outer cylindrical surfaces or diameters 24 and 28 of main surface wheels 20 and 22, respectively.

In view of the above, it can be seen that if, in FIG. 5, clockwise rotation of shaft 38 and main load roller 32 is assumed, upper reaction roller 34 will also rotate clockwise and in so doing, by virtue of its outer diameter 84 rolling against the outer diameters 24 and 28 of main locomotion wheels 20 and 22, along with the outer surface 102 of belt 98 frictionally engaging the same outer cylindrical surfaces 24 and 28, cause wheels 20 and 22 to rotate counterclockwise. Such counterclockwise rotation of wheels 20 and 22 would, of course, cause the device 18 to move to the left.

FIG. 6, a cross-sectional view taken on the plane of line 6—6 of FIG. 3, illustrates the placement of a first continuous or endless main load belt 104. That is, the main load belt 104 is placed upon surface wheels 20 and 22 so as to be situated within the respective circumferential main load belt grooves 76 and 82. The inner most side 106 of the load belt 104 is held against such grooves while the outermost side 108 of belt 104 is first passed under and held against the outer diameter or surface 88 of reaction roller 36. In contrast, what might be considered the lower run of load belt 104 is passed over the top of main load or power input roller 32 in a manner whereby the outermost surface 108 is held in belted contact with the outer diameter or surface 64 of the main load roller 32. In view of the above, it can be seen that if the same clockwise rotation of input roller 32 is again assumed, the traction device 18 will move to the left during which time the main load belt 104 will move in a generally counterclockwise direction about surface locomotion wheels 20 and 22 as will also, a suitable tread belt 110.

FIG. 7, a fragmentary cross-sectional view taken generally on the plane of line 7—7 of FIG. 3, illustrates the placement of a second main load belt 112 which is passed about the various elements in the same manner generally described with reference to FIG. 6 except that main load belt 112 is received in and follows the second set of load belt grooves 74 and 80 formed in surface wheels 20 and 22, respectively. In this arrangement, of course, the innermost surface 114 of belt 112 is held against grooves 74 and 80 while the outermost surface 116 is held against the outer diameters or surfaces 84 and 64 of reaction roller 34 and main load hub 32, respectively. The respective directions of rotation as discussed with reference to FIGS. 4, 5 and 6 apply equally well to the arrangement of FIG. 7.

Figure 8:
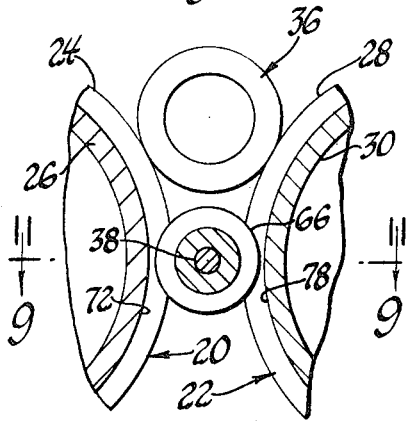
FIG. 8 is an enlarged fragmentary cross-sectional view taken on the plane of line 8—8 of FIG. 3.

As generally illustrated by FIGS. 8 and 9, the tracking flange 66 of main load roller 32 is adapted to be received within the tracking grooves 72 and 78 of surface wheels 20 and 22 to react independently when negotiating obstacles in their path of travel. The relative flexibility of the various belts and the loosely confined tracking flange 66 enables the hubless surface driving wheels 20 and 22 to be displaced in a manner wherein their respective centerlines or axes assume a nonparallel or even skewed relationship in all directions, as well as with reference to the reaction rollers or wheels 34, 36 and power input load hub 32, without loss of rolling integrity.

The invention as thus far described discloses a wheeled traction device which employs two or even more main load belts 104 and 112 which are situated about and in engagement with a plurality of surface locomotion wheels 20, 22 and a main load wheel or roller 32 as well as a plurality of snubbing reaction drumlike wheels 34 and 36. The load belts 104 and 112, as shown in FIGS. 6 and 7, almost totally circumscribe the driving wheels 20 and 22 thereby providing for an exceptionally large area for driving contact therebetween.

Further, as can be seen in FIGS. 4 and 5, each of the belts 92 as well as belts 98 are placed in tension creating first reaction forces against the power input or load hub 32 tending to move roller 32 upwardly and reaction rollers 34 and 36 downwardly against the resistance of the load belts 104 sand 112. Consequently, load belts 104 and 112 are placed in tension thereby enhancing the frictional drive between the load belts and surface wheels 20 and 22. Additionally, as can also be seen in FIGS. 4 and 5, the tensioned reaction belts 92 and 98 are somewhat arcuately deflected by arcuate segments of surface drive wheels 20 and 22.

Although not essential, one preferred embodiment of the invention contemplates the positioning of the main load roller or wheel 32 in such a manner as to have its centerline of rotation (when all elements have their respective centerlines nominally parallel to each other) in a plane which passes through and contains the nominal centerlines or axes 118 and 120 of wheels 20 and 22. If this relationship is achieved, the ability of surface drive wheels 20 and 22 to attain skewed relationships with respect to each other is greatly enhanced.

Depending upon the structure and composition of the hubless wheels 20 and 22, and the loads supported, a wide range of design flexibility is inherently provided so that the apparatus 18 constitutes a combined load bearing suspension and surface locomotion system. If desired, the load belt engaging surfaces of the various elements as well as the wheels 20 and 22 may be hardened or otherwise formed or treated for wear of the elements or the particular material employed; it should be apparent that the apparatus 18 is constructed so as to permit the employment of a broad variety of materials, depending upon the application intended. To this extent it should be mentioned that load belts 104 and 112 as well as the constraining belts 92 and 98 may be or a suitable elastomer and may, if desired, be reinforced. Further, it is conceivable that a continuous or endless link type belt could be employed in the formation of a load belt.

As best shown in FIG. 6, in the preferred embodiment of the traction device a suitable continuous tread belt 110 is provided and looped about the drive wheels 20 and 22 so as to have a lower run 122 engaging the ground surface, and an upper run portion 124 passing freely over the reaction members 34 and 36. The precise configuration or the specific material forming the tread belt forms no part of this invention since the practice of this invention is no way limited to the use of a particular type of belt.

In view of the preceding, it can be seen that the invention as herein disclosed provides, through the coaction of guide flange 66 and guide grooves 72 and 78, means for effectively assuring continued tracking of the various cooperating elements regardless of the requirements of the terrain on which the traction device 18 is employed. Also, as has been described in detail, the invention provides snubbing or tension augmentation means which serve to create not only increased constraining forces on the load belts but also have the additional benefit of causing the load belts to encircle and thereby contact a greater portion of the respective surface driving wheels. This, of course, increases the efficiency of the overall structure in terms of the total torque which can be effectively transmitted from the power input member, such as 32, to the surface drive wheels 20 and 22.

Further, as can be seen, the invention enables what might be considered the lower run of the respective load belts to be looped over and against the top of the main load or power input roller 32. This feature becomes a significant improvement over the prior art which can be better appreciated when one considers the alternative to such an arrangement. That is, if the bottom or lower run of the load belts 104 and 112 was permitted to remain as in the prior art, that is, so as to be substantially tangential to the wheels 20 and 22 at the lower or underside thereof, any debris which would possibly fall over the top of such load belt lower run could be caught between the load belt and the surface drive wheel causing such load belt to be dislodged from the surface drive wheel or cause such apparatus to jam or lockup. Additionally, such a straight lower run of the load belt, because the load belt is under tension, creates a resisting force to the tendency of the tread belt, if one is employed, to flex upwardly in conforming to the terrain.

Accordingly, it becomes obvious that by displacing the lower run of the load belts upwardly (or at least some of the load belts where a plurality of such load belts are employed), provision is thereby made for the enhanced upward flexing of the lower run of the tread belt. This brings about another important advantage of the invention. That is, referring to FIG. 6, let it be assumed that the device 18 is traversing relatively soft or water soaked ground having a nominal elevation indicated generally at 122. Further, if it is assumed that the traction device 18 was initially at the same height or elevation as surface 122 but that it started to depress the ground or soil because of the weight of the device 18, and vehicle supported thereby, it can be seen that the lower run portion 124 of tread belt 110 would start to flex and elongate upwardly and that when the upward force of the soil finally equaled the downward force of the traction device 18 and associated vehicle, the traction device 18 would assume a position, as generally depicted in FIG. 6, relative to the otherwise normal soil surface 122. At this time the lower run 124 of tread belt 110 would have flexed and elongated upwardly assuming a configuration as shown at 124a.

It should be apparent that if the traction device 18 were situated atop firm flat terrain, that the footprint area thereof would be the effective width of the tread belt 110 multiplied by the dimension or distance, D, which, as shown in FIG. 6, is the nominal distance between centers of surface drive wheels 20 and 22. It should also be obvious that as the traction device 18 progressed downwardly into the soft soil 122 that the footprint area of the traction device increased to include such areas as are determined by dimensions, $d_1$, and, $d_2$, which, as shown in FIG. 6, are the distances from the centers of wheels 20 and 22 to where the soil surface 122 contacts the outer surface of tread belt 110. In view of the above it can be seen that as the traction device 18 tends to "sink" into the surface the device 18 itself causes its footprint to have an increasing area which, in turn, reduces the per-square-inch loading of the soil and thereby minimizes the degree to which the soil will be depressed by the traction device.

In addition to the above, the lifting force of the traction or locomotion device 18 is further enhanced by the upward deflection of the lower run 124 of the tread belt 110. That is, as the lower run 124 progressively deflects toward the position shown at 124a, the soil underneath is forced into a crownlike shape. The upwardly deflected tread belt run thereby somewhat traps the soil and substantially precludes lateral shifting of such soil. Accordingly, it can be seen that the soil beneath the upwardly deflected lower tread belt run provides an upwardly directed force, against the tread belt, greater than merely the equivalent of the projected area determined by dimension, D. Not only does the upward deflection of the lower run of the tread belt aid in resisting the "sinking" of the locomotion device 18, but it also provides another important advantage, which is, the minimization of any dirt or foreign particles falling onto the top surface of the lower run of the tread belt. This, of course, results from the tendency of such lower tread belt run to deflect upwardly and thereby tend to remain on top of the soil supporting the locomotion device 18.

In addition to the above, another benefit is derived from the upward deflection of such lower run portion 124. As best illustrated in FIG. 6, it can be seen that as the lower run portion 124 is deflected upwardly, the portions of the tread belt 110 in close proximity to the surface locomotion wheels 20 and 22 are to some degree caused to wrap around the curvature of the wheels 20 and 22 and to that extent cause greater frictional engagement between the wheels 20 and 22 and belt 110 as well as a greater force holding the load belts 104 and 112 against the same wheels 20 and 22.

The arrangement of passing the lower run of the main load belts 104 and 112 over the top of the main load hub or roller 32, as illustrated in FIGS. 6 and 7, provides further benefits to the overall locomotion device 18. That is, if, for example, the apparatus as shown in either FIG. 1 or FIG. 6 is assumed to be traveling toward the left and in so doing encounters some obstacle, such as generally indicated at 126 of FIG. 1, the forward wheel 20 upon first encountering and climbing over the obstacle (or some other hump in the terrain) tends to move away from the main load hub 32 and to pivot about the upper reaction rollers 34 and 36. Similarly, as the second wheel climbs the obstacle the same action occurs with respect to that wheel. In other words, the entire apparatus has more snap or resiliency enhancing both the ride and climbing characteristics of the locomotion device 18. This feature becomes even more evident when a comparison is made to a structure as the device 18 but one which has all of the load belts provided with a straight tangential lower run. In that arrangement it should be apparent that the straight lower runs would produce a greater constraining effect which would inhibit any tendency of either wheel 20 or 22 to pivot about the upper reaction rollers.

The last major improvement or advantage of the invention, which in view of the preceding may have already become apparent, is the provision of a plurality of upwardly disposed reaction rollers 34 and 36 which are separated but generally axially disposed with respect to each other. The provision of such separated reaction rollers enables the surface driving wheels to achieve maximum skewed positions relative to each other if the terrain be such as to require such a skewed relationship. It should be apparent that, as viewed in FIGS. 1 and 3, for example, if the surface locomotion wheels 20 and 22 should undergo relative deflection wherein the right end of the wheel 22 (as viewed in FIG. 3) should be urged upwardly and toward the wheel 20 (as viewed in FIG. 1) that reaction wheel or roller 36 will be moved upwardly and somewhat to the left (as viewed in FIG. 1). This means that mostly all of the resistance to such upward movement of reaction roller 36 is produced by the reaction or constraining belts 92 and that very little, if any, resistance to such upward displacement of reaction roller 36 is afforded by the reaction or snubbing belts 98 associated with reaction or snubbing roller 34. This, of course, would not be true if the reaction rollers 34 and 36 were in fact formed to be a single reaction member of equivalent length.

Figure 10:
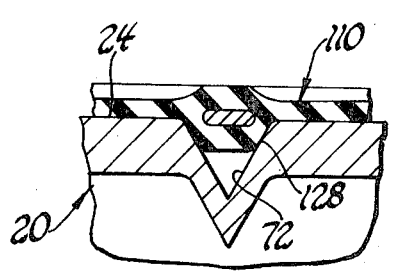
FIG. 10 is an enlarged fragmentary cross-sectional view taken generally on the plane of line 10—10 of FIG. 6.

Parenthetically, it might be mentioned that, as shown in FIG. 10, the tracking groove 72 (as well as the cooperating tracking groove 78 in wheel 22) may be employed for receiving therein a lower guide rib portion 128 of the tread belt 110.

Although only one preferred embodiment of the invention has been disclosed and described, it is apparent that other embodiments and modifications of the invention are possible without exceeding the spirit and the scope of the invention.

I claim:

1. A multiwheeled integrated load-suspension and surface locomotion device for use with an associated vehicle, comprising at least first and second spaced surface locomotion wheels, first endless load belt means circumferentially loading said spaced surface locomotion wheels, and second constraining means operatively engaging said first means and said spaced surface locomotion wheels, said second means comprising rotatable vehicle load input means and a plurality of reaction-type rotatable members, said plurality of reaction-type rotatable members comprising a first rotatable reaction member, a second rotatable reaction member, said first and second rotatable reaction members being situated generally intermediate said first and second surface locomotion wheels and operatively engaging said endless load belt means, said first and second rotatable reaction members being nominally coaxial with each other but being angularly displacable with respect to each other.

2. A multiwheeled locomotion device according to claim 1 wherein said vehicle load input means comprises a rotatable load carrying member, and wherein said endless load belt means circumferentially engages a major portion of said first and second surface locomotion wheels, said rotatable load carrying member being positioned generally intermediate of said first and second surface locomotion wheels and operatively engaging said load belt means.

3. A multiwheeled locomotion device according to claim 1 including tracking means formed on at least said first and second surface locomotion wheels and said rotatable load input means, said tracking means being effective to maintain the integrity of rolling relationship between at least said rotatable load input means and said first and second surface locomotion wheels.

4. A multiwheeled locomotion device according to claim 1 wherein said second constraining means comprises endless constraining belt means operatively circumferentially engaging said plurality of reaction-type rotatable members and said load input means, said endless constraining belt means being effective to urge said plurality of reaction-type rotatable members toward said load input means and to yieldingly tension said endless load belt means.

5. A multiwheeled locomotion device according to claim 1 wherein said load input means comprises a rotatable load-carrying member situated generally between said first and second surface locomotion wheels, wherein said plurality of reaction-type rotatable members are situated in axial relationship with each other generally between said first and second surface locomotion wheels and above said rotatable load-carrying member, said endless load belt means also passing under and rollingly contacting said first and second rotatable reaction members while passing over and rollingly contacting said rotatable load-carrying member, wherein said second constraining means comprises endless constraining belt means circumferentially engaging said first and second rotatable reaction members and said rotatable load-carrying member, said endless constraining belt means being effective to create a tension in said endless load belt means by urging said rotatable reaction members and said rotatable load carrying member toward each other and simultaneously urging said first and second surface locomotion wheels away from each other.

6. A multiwheeled locomotion device according to claim 5 including a flange carried circumferentially about said rotatable load-carrying member, a first groove formed in and circumferentially about said first surface locomotion wheel, a second groove formed in and circumferentially about said second surface locomotion wheel, said first and second grooves being effective to rollingly receive said flange therein and thereby limit relative translational movement between said first and second surface locomotion wheels.

7. A multiwheeled locomotion device according to claim 5 wherein said first and second surface locomotion wheels are in rolling contact with said first and second rotatable reaction members and said rotatable load-carrying member.

8. A multiwheeled locomotion device according to claim 5 including endless tread belt means circumferentially engaging said first and second surface locomotion wheels.

9. A multiwheeled locomotion device according to claim 5 wherein said rotatable load-carrying member is so positioned as to have the axis of revolution of said rotatable load-carrying member nominally coplanar with a plane containing the axes of rotation of said first and second surface locomotion wheels when said locomotion wheels are in position so as to have said axes nominally parallel to each other.

10. A multiwheeled locomotion device according to claim 5 wherein said endless constraining belt means also rollingly engages said first and second surface locomotion wheels.

11. A multiwheeled locomotion device according to claim 5 wherein said endless constraining belt means comprises first and second endless constraining belts operatively engaging said first rotatable reaction member and said rotatable load-carrying member, and third and fourth endless constraining belts operatively engaging said second rotatable reaction member and said rotatable load-carrying member.

12. A multiwheeled locomotion device according to claim 11 wherein said endless load belt means comprises first and second endless load belts, said first and second load belts being axially spaced from each other and along said first and second surface locomotion wheels so as to have said first load belt pass generally between said first and second constraining belts and to have said second load belt pass generally between said third and fourth constraining belts.

13. A multiwheeled integrated load-suspension and surface locomotion device for use with an associated vehicle, comprising at least first and second spaced surface locomotion wheels, endless load belt means circumferentially engaging said surface locomotion wheels and including upper and lower load belt run portions extending between said surface locomotion wheels, rotatable load input means operatively engaging said endless load belt means, said rotatable load input means comprising first rotatable means operatively engaging said upper run portion and urging said upper run portion downwardly, second rotatable means operatively engaging said lower run portion and lifting said lower run portion upwardly a substantial distance above a theoretical plane tangential with the lower portions of said spaced surface locomotion wheels, said second rotatable means being positioned so as to be located at an elevation totally above said theoretical plane, and constraining means operatively engaging said first rotatable means and said second rotatable means, said constraining means being effective to yieldingly urge said first and second rotatable means and said upper and lower run portions respectively toward each other even when the weight load of said associated vehicle is removed from said locomotion device as when upward acceleration is imparted thereto causing said spaced surface locomotion wheels to become totally unsupported by any surface being traversed by said associated vehicle.

14. A multiwheeled surface locomotion device according to claim 13, wherein said constraining means comprises second endless belt means looped about and engaging said first and second rotatable means.

15. A multiwheeled surface locomotion device according to claim 14, wherein said second endless belt means includes first and second generally vertically directed run portions extending between said first and second rotatable means, said vertically directed run portions effectively engaging respective peripheral portions of said spaced surface locomotion wheels and urging said surface locomotion wheels away from each other.

16. A multiwheeled surface locomotion device according to claim 13, wherein said first rotatable means comprises at least first and second rotatable members in general axial alignment with each other, wherein said second rotatable means comprises a single third rotatable member, wherein said endless load belt means comprises at least first and second endless load belts, wherein said first rotatable member effectively engages the upper run of said first endless load belt while said second rotatable member effectively engages the upper run of said second endless load belt, and wherein said third rotatable member effectively engages the lower run portions of both said first and second endless load belts.

17. A multiwheeled surface locomotion device according to claim 16, wherein said constraining means comprises first and second endless constraining belt means, said first constraining belt means being looped about and operatively engaging said first rotatable member and said third rotatable member, and said second constraining belt means being looped about and operatively engaging said second rotatable member and said third rotatable member, each of said constraining belt means being effective to yieldingly urge said rotatable members operatively engaged thereby toward each other.

18. A multiwheeled surface locomotion device according to claim 17, wherein said third rotatable member is so positioned as to have the axis of revolution of said third rotatable member nominally coplanar with a plane containing the axes of rotation of said first and second spaced surface locomotion wheels when said locomotion wheels are in position so as to have said axes nominally parallel to each other.

19. A multiwheeled integrated load-suspension and surface locomotion device for use with an associated vehicle, comprising at least first and second spaced surface locomotion wheels, endless load belt means circumferentially engaging said surface locomotion wheels and including upper and lower load belt run portions extending between said surface locomotion wheels, rotatable load input means operatively engaging said endless load belt means, said rotatable load input means comprising first rotatable means operatively engaging said upper run portion and urging said upper run portion downwardly, second rotatable means operatively engaging said lower run portion and lifting said lower run portion upwardly a substantial distance above a theoretical plane tangential with the lower portions of said spaced surface locomotion wheels, said first rotatable means comprising at least first and second rotatable members in generally axial alignment with each other, said second rotatable means comprising a single third rotatable member, said endless load belt means comprising at least first and second endless load belts, said first rotatable member effectively engaging the upper run of said first endless load belt while said second rotatable member effectively engages the upper run of said second endless load belt, said third rotatable member effectively engaging the lower run portions of both said first and second endless load belts, said constraining means comprising first and second endless constraining belt means, said first constraining belt means being looped about and operatively engaging said first rotatable member and said third rotatable member, said second constraining belt means being looped about and operatively engaging said second rotatable member and said third rotatable member, each of said constraining belt means being effective to yieldingly urge said rotatable members operatively engaged thereby toward each other, and each of said rotatable members being of a generally cylindrical configuration.

* * * * *